Nov. 25, 1947.  J. KREITNER ET AL  2,431,405
METHOD FOR DETERMINING GM OF A SHIP
Original Filed Sept. 6, 1940
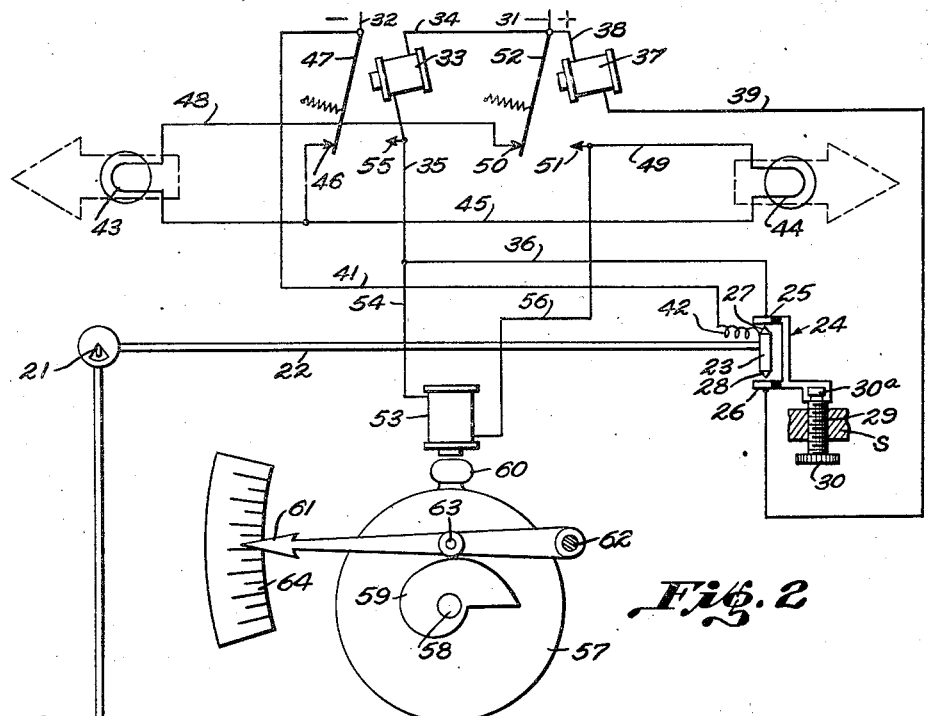
Fig. 2
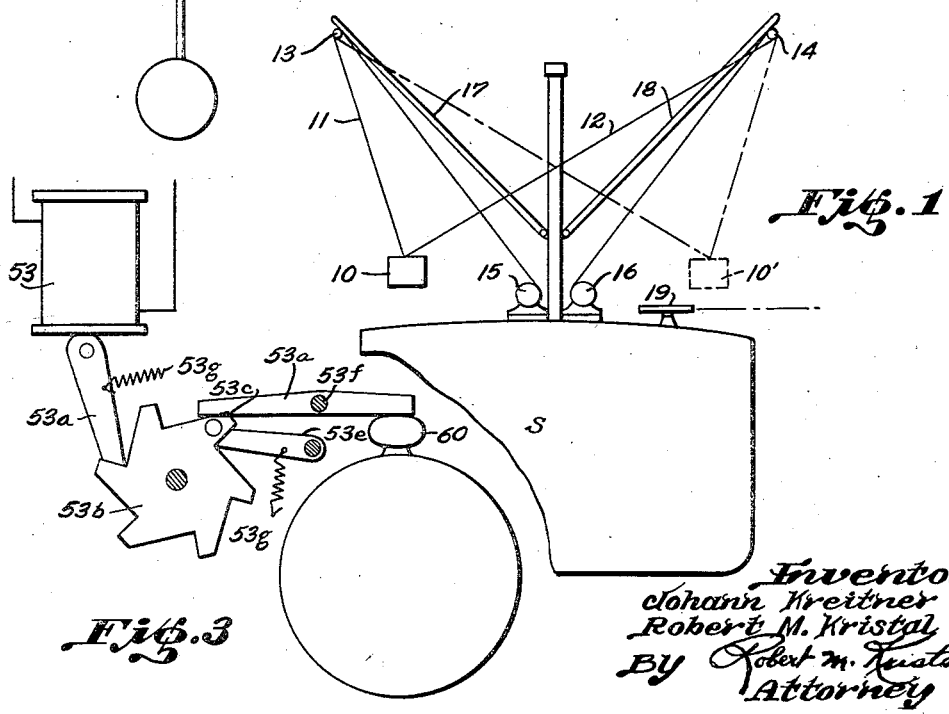
Fig. 1
Fig. 3
Inventors:
Johann Kreitner and
Robert M. Kristal
BY Robert M. Kristal
Attorney Patented Nov. 25, 1947

2,431,405

UNITED STATES PATENT OFFICE 2,431,405

METHOD FOR DETERMINING GM OF A SHIP

Johann Kreitner and Robert M. Kristal,
New York, N. Y.

Original application September 6, 1940, Serial No. 355,552. Divided and this application February 19, 1944, Serial No. 523,080

5 Claims. (Cl. 73—65)

This invention pertains to method of determining the initial stability of ships and to apparatus useful in the practice of such method.

The present application is a division of our copending application, Patent No. 2,341,563.

In loading a ship it is essential to keep the center of gravity within a certain range below the metacenter in order to insure safe stability together with smooth seagoing qualities.

Heretofore initial stability has been determined by way of calculation which gave the metacentric height by considering the hull form and the condition of loading. The accuracy of such method is doubtful due to the difficulty of obtaining a reliable figure for the vertical location of the center of gravity of a loaded ship. This vertical center of gravity is usually obtained by calculation combining the center of gravity of the built weight with that of the deadweight.

For built weight the vertical center of gravity is usually determined by an incline test, i. e. the transverse shifting of a known weight over a known distance, and measuring the change in heel caused thereby. But such a test, in order to be reliable, requires so much time, care and expense that it is seldom made more than once in the life of a ship. In any event it is next to impossible to gather accurate information as a basis for calculation about all the differences in the vertical distribution of weights between the condition at the last incline test and the present loaded condition of the ship. Hence, to a certain extent, the exact influence of the vertical distribution of weights is left to guess work and mere approximation.

On the other hand, to employ such an incline test just previous to each sailing of a loaded ship is impractical because as above stated it is difficult, delicate, expensive, time consuming and the preparation for such test interferes with the loading of the ship.

Because reliable calculations are so difficult to obtain, conscientious masters run their ships with a certain margin of safety in stability. This impairs a ship's economy of operation due to the fact that she must carry excess ballast.

Furthermore, any excess of stability adversely affects a ship's movements in a seaway causing well known inconveniences and disadvantages.

It is, therefore, highly desirable to eliminate such speculation or approximation and be able to measure directly the stability of a loaded ship as she happens to float.

As yet, no practical method to actually measure GM just prior to each sailing has been devised.

Our invention provides such a method.

To this end, we derive the metacentric height from kinematic characteristics of the ship's rolling movement, after such movement has been excited in substantially calm water.

We are aware of a device which is also based on kinematic quantities of a ship's rolling movement. But this prior art device attempts to derive stability from a ship's roll in a seaway and not from her natural roll in substantially calm water.

Furthermore this device works by measuring the maximum angular velocity together with the maximum angle of roll and combining these two quantities in a definite way.

We have found that stability can be measured and determined in a much simpler way by using its relation to the period of roll instead of the complicated combination of the maximum angular velocity and the maximum angle of roll.

We have further found that true stability can only be derived from a ship's natural roll rather than from the forced oscillation in a seaway.

Thus we eliminate the following serious disadvantages of this prior art instrument:

1. It requires a very intricate construction due to the principle of measuring and combining two kinematic characteristics.

2. It does not aid in the highly important matter of properly loading a ship because it does not function until the ship has left port and meets a seaway.

3. It does not always measure and indicate true stability because its theory of operation is based on the free natural roll of a ship, while the instrument functions only in a seaway where the ship's movement is a highly complex mixture of a free roll having the ship's natural period, and a forced oscillation having the period of wave encounter.

Our invention obviates all the aforementioned disadvantages and inaccuracies by providing a method for easily determining the true stability of a ship during loading and while she is still in port.

It is an object of the present invention to provide a method for easily measuring the true metacentric height of a floating vessel so that such measurement can be frequently repeated as a routine measure in ordinary operation.

It is another object of our invention to permit such measurement while a ship is still in port thus allowing for correction of stability, if necessary, before sailing.

It is another object to provide a method for the determination and measurement of true stability which is free from the error caused by the influence of encountering waves.

Still another object of our invention is to increase the safety of ship operation by making it possible to frequently check on and measure stability thus obviating any guess work.

Still another object of our invention is to provide a simple method for measuring true stability in order to enhance the economy of ship operation by permitting the master to run his ship with the least amount of ballast co-extensive with safe stability.

Still another object is to provide a method for measuring GM which will not interfere with the usual activity aboard a ship.

The present method provides a simple and efficient way of measuring the stability of a loaded ship, which stability can readily be ascertained before each sailing with a minimum amount of trouble and expense and without substantial loss of time, thereby adding a new feature of safety to each clearing of port.

In the accompanying drawing, we have shown for purpose of illustration only, one form of apparatus useful in the practical application of our method, and in the drawings:

Fig. 1 is a diagrammatic transverse section of a ship showing the cargo handling devices and weight ready for the performance of our method.

Fig. 2 is a diagrammatic and schematic view of an instrument useful in carrying out our method.

Fig. 3 is a diagrammatic view of mechanism for stopping the stop clock after a pre-determined number of oscillations.

Our invention comprises the method of determining the stability of ships by exciting rolling oscillations in calm or comparatively calm water, measuring kinematic quantities of these oscillations, preferably their natural period, and determining the metacentric height from the known formula $$GM = \frac{1}{g}\left(\frac{2r}{t}\right)^2$$

where GM is the metacentric height, $g$ the acceleration of gravity, $t$ the time for one full oscillation, and $r$ the radius of gyration of all masses relative to a longitudinal axis through the center of gravity.

It is known that the three quantities, metacentric height, radius of gyration, and natural period of roll, are connected by a relation equivalent to the pendulum formulae. This relation has heretofore been employed to infer the effects which variations in GM and the radius of gyration have on the period of roll. As distinct therefrom our invention uses the measurement of a ship's natural period of roll to obtain and maintain information concerning GM in routine operation. Thus our invention surveys an important operative datum which is elusive and sensitive to changing loading conditions, and which evanescently varies within and even beyond the permissible range.

Such application of the natural period of roll to survey GM during normal ship operation is new as far as we know, and is based on the realization that the radius of gyration remains practically constant for changes in loading conditions which, on the other hand, cause the widest variations in GM. The radius of gyration usually amounts to approximately one-third of the beam.

In particular, the method contemplates using power winches or similar appliances to exert rhythmical rolling impulses in synchronism with the natural rolling oscillation of a ship, in order to pitch up the oscillations.

The manner of applying mechanical power for exerting rhythmical impulses may vary according to circumstances. For example, rhythmical tilting pulls may be exerted by employing a winch rope led over a pulley fixed to the tip of a boom, from which point the rope travels transversely to a point of anchorage at shore.

One particularly simple and advantageous way of employing our method, however, comprises lifting a weight, for instance a suitable piece of cargo, spare anchor, or the like, and moving the same rhythmically athwartship to and fro by means of the cargo handling devices. When such a weight, preferably between one ten-thousandth and one-thousandth of the ship's displacement, is moved to starboard, a slight starboard list will ensue. The direction of such inclination should be observed by some simple sight device or by means of a pendulum, level instrument or the like, in order to know when to shift the weight to the other side. With the starboard list achieved, the weight is moved to portside. As soon as portside is sinking below level position, the weight is shifted to starboard, and so on. Thus the moving of the weight towards the momentarily higher side pitches up the oscillation of the ship. It is preferable to employ a device which will automatically designate when and to which side to shift the weight.

After the weight has been swung to and fro a few times, the angle of roll will be sufficient to permit a precise measurement of the period. The natural period is then measured, for instance, by taking a stop watch reading over a number of oscillations during the dying out of the roll, or by using automatic time measuring devices actuated electrically or otherwise.

Cargo handling devices have hitherto been used to lift a weight and move it transversely in order to execute an incline test as described hereinbefore. But this is a static shifting, readings being taken with the ship at rest. This known method requires an exact measurement of the shifting weight, its stroke, and the static inclination thereby caused. As distinct therefrom our method uses the cargo handling device to dynamically shift a weight in order to excite rolling oscillations.

With our method it is unnecessary to know the weight, or to measure its transverse stroke, or the angle of inclination of the ship. The only necessary measurement is a stop watch reading, which makes the method simple; and the only quantity obtained by computation is the radius of gyration $r$, which makes the method reliable, particularly as this radius is a quantity which is much less subject to change than the center of gravity or the metacenter.

This radius may also be directly measured and determined once and for all by combining one oscillation test according to our invention with one incline test of the usual kind. But such combined tests are only necessary in exceptional cases, where special reasons require greater precision in the determination of stability. Normally, there is no tangible difference in a ship's sea-going qualities whether her true metacentric height is 2 ft. 2 inch or 2 ft. 4 inch. Hence, whether the precise radius of gyration is 22 ft. or 23 ft. has a very slight effect on the result of a testing employing our invention. Therefore, in ordinary cases, the radius of gyration may be simply approximated from previous calculations and measurements, as, for example, ordinarily taking one third (⅓) of the beam.

One feature of our invention consists in measuring stability at comparatively very small rolling oscillations. While the roll of a ship in a moderate seaway varies up to +5° or more, the test according to our invention is preferably executed at rolling amplitudes not exceeding +1°. This has several advantages:

1. At small rolling angles the damping effect of bilge keels, etc., is very small, so that little energy is wasted in overcoming the resistance; furthermore, small rolls die out comparatively slowly, thus repeated readings can be taken with the same degree of accuracy.

2. Small amplitudes can conveniently be excited with comparatively small weights and in a relatively short time.

3. A stability test using small angles of roll is almost imperceptible and will not interfere with the ordinary activity aboard a ship.

While apparatus employing our method is preferably adjusted to permit measurement at small rolling angles, measurement at greater angles may be necessary where initial disturbing movements of a ship are caused by other rhythmical impulses, such as swell, rhythmical gusts of wind, pulsations of current or the like. Whenever any such disturbing movement exists prior to a test employing our method, the excitation should preferably be driven to an amplitude at least four times greater than the disturbing movement. Thus the falsifying influence of such disturbance is reduced to an insignificant fraction of the result.

In the drawings Fig. 1 shows one example of employing our method. A weight 10, which may be a suitable piece of cargo or other weight, is suspended by means of ropes 11 and 12, pulleys 13 and 14, and winches 15 and 16. The pulleys are fastened to booms 17 and 18, which are held in position by ropes (not shown).

By jointly operating the winches 15 and 16 in the manner usual for transverse movement of cargo, the weight 10 can be easily guided to position 10', indicated by dotted lines, and back to its original position, and so on, in synchronism with the rolling oscillations of the ship S. The instant state of inclination may be observed, for example, by a sight device 19 aimed at the horizon or at a suitable fixed point at shore. A pendulum, level or similar indicating device may be used in place of the sight device. The man at the device 19 directs the operation of the winches so that the weight will start travelling toward starboard as soon as the starboard side rises above level position, and will return towards portside as soon as portside rises above level position. The operating speed of modern cargo handling devices easily permits the weight to keep pace with the ship's rolling oscillations, so that in most cases the weight will have to remain at rest several seconds before beginning its return to the other side.

The weight shifting operation may be directed by a man on a device 19, or by a device which guides the winch operator by signals which automatically change according to the ship's direction of inclination, or it may be effected by a device which will automatically actuate the winches corresponding to the direction of inclination.

The weight may be moved horizontally, lifted or lowered at the same time, or may move in a circular arc or any other curve; the weight may also be suspended by only one rope, and moved by other ropes which extend substantially in a horizontal direction; or it may be fastened to one boom and the boom caused to swing from one side to the other. Instead of booms other types of cargo handling devices or other power winches may be applied without departing from the essence of our invention, which comprises using the mechanical power of winches or other similar appliances to exert rhythmical rolling impulses in such synchronism and phase that rolling oscillations are pitched up.

The method herein is carried out by use of mechanism such as illustrated in Fig. 2. While this mechanism is shown as electrically operable, it may be mechanically, pneumatically or hydraulically operable to accomplish similar results.

The device employs a pendulum 20 of suitable length, pivoted as on the knife-edge 21, which is fixedly connected to the ship. The pendulum is provided with an arm such as 22, the latter having a contactor 23. If desired, the arm 22 may be omitted and the contactor 23 arranged directly upon the pendulum 20.

Associated with the contactor 23, there is preferably provided a yoke-like member 24 so arranged as to have its flanges 25 and 26 in the path of movement of the respective ends 27 and 28 of said contactor.

The yoke-like member 24 is preferably adjustable with respect to the ship S, an example of means for providing such adjustment being shown and comprising a threaded member 29 controlled by a knob 30 and connected by a swivel 30a to the member 24. In place of manual adjustment, various automatic adjusting means may be employed such as a dashpot-damped second pendulum, an electric self-adjusting device, or the like.

A source of preferably direct current is provided, being connected to the respective positive and negative lines 31 and 32.

The yoke member 24 carries two contact points on the flanges 25, 26 insulated from each other, which are adapted to contact with the ends 27, 28 of contactor 23. The contact point 25 is connected to the positive line 31 through a relay coil 33 as by conductors 34, 35, 36. The contact point 26 is connected to said positive line 31 through a relay coil 37 as by conductors 38 and 39.

The contactor 23 is connected to the negative line 32 as by means of a conductor 41, a pig-tail 42 being provided to compensate for the motion of the pendulum arm 22.

Signal lamps 43 and 44 are provided. A conductor 45 is arranged to connect one side of said lamps, said conductor being provided with a contact 46 for an armature 47 associated with the relay coil 33. The other sides of the lamps 43 and 44 are each connected by the respective conductors 48 and 49 to the respective contacts 50 and 51, which are associated with an armature 52 of the relay coil 37.

A moveable core solenoid or similar device 53 is provided, one end being connected as by a conductor 54 to contact 55 associated with the armature 47 and connected to conductor 35, and the other end by a conductor 56 to the contact 51.

The solenoid 53 is arranged, when energized, to set into operation means for measuring the rolling period, such as the stop clock mechanism 57. The dial face of the stop clock 57 may be directly calibrated in terms of metacentric height if the radius of gyration of the particular ship is taken into consideration, but such calibration would result in very uneven spacing.

In order to obtain substantially even spacing of the GM calibration the hand shaft 58 of this mechanism may be provided with a cam 59 of suitable design which is caused to rotate upon depression of the knob 60 by the core of the solenoid 53.

A pointer arm 61 is mounted on a fixed pivot 62 and associated with cam 59 by means of follower 63. The pointer is arranged to move across a scale 64 graduated in terms of the ship's true GM; the curve cam 59 is so shaped that the graduation in the scale is substantially evenly spaced.

When the pendulum is in equilibrium as shown, the contactor 23 is minutely spaced from flange 26 and comparatively greatly spaced from flange 25. As long as contactor 23 does not contact either flange, the signal light 43 will be lit by a circuit including the line 31, armature 52, contact 50, conductor 48, lamp 43, conductor 45, contact 46, armature 47, and line 32. The signal light 44 will remain unlighted and the solenoid 53 unenergized.

When the pendulum 20 swings to the left to cause contact between the point 28 of the contactor and the flange 26, a circuit will be established through relay coil 37 which becomes energized to draw its armature 52 into engagement with the contact 51; thus signal lamp 43 goes out and signal lamp 44 is lit.

When a ship, according to our method, is being excited into increasing rolling oscillations, there is a regular sequence of contact and break between points 28 and 26. As long as contact exists, signal lamp 44 is lit; as long as no contact exists, signal lamp 43 is lit.

The illuminated arrow thus points uphill and indicates the direction in which to shift the weight.

The signal lamps need not be incorporated in the instrument itself but may be arranged in any convenient spot on board the ship, preferably where they are easily visible by the winch operator.

The initial oscillations of the ship are considerably smaller than the angle corresponding to the clearance between points 26 and 25; thus no contact is established with flange 25 during the initial stage of measurement, and armature 47 remains in the position as shown in the drawing.

As soon as rolling oscillations are pitched up to an amplitude sufficient to permit precise measurement of the period, the action of contacts 26, 28 is diverted from the signal lamps to the means controlling the stop clock. This diversion may be accomplished either manually by throwing a switch or automatically, as shown, by the action of the contacts 25, 27.

Thus the angle at which such diversion takes place is pre-determined by the clearance of contactor 23 within yoke-member 24. As soon as the pendulum, at its maximum stroke to the right, establishes contact between 27 and 25, relay coil 33 is energized to draw its armature 47 into engagement with contact 55. This performs the following:

1. A holding circuit is established from positive line 31 through conductor 34, relay coil 33, contact 55, armature 47 to negative line 32, holding armature 47 in engagement with contact 55 after contact between contactor 23 and flange 25 has been broken with the swinging back of the ship.

2. Both signal lamps 43, 44 are cut off from negative line 32 and go out, thus indicating when to stop the weight shifting.

3. Solenoid 53 is connected to negative line 32 through armature 47, contact 55 and conductors 35, 54, thus conditioning the solenoid to be energized through armature 52.

A half oscillation later, contactor 23 touches flange 26; thus relay coil 37 is energized to draw armature 52 into engagement with contact 51; this energizes solenoid 53 and starts the stop clock mechanism. The moment contact is broken between points 28 and 26, solenoid 53 is de-energized and knob 60 released.

One full oscillation later, point 28 once more contacts flange 26 and depresses knob 60 again, stopping the stop clock. The pointer 61 then rests and shows directly the value of the ship's true metacentric height.

Instead of measuring the period of one oscillation, the device may be so arranged that it stops the stop clock after a pre-determined number of oscillations. One such arrangement is shown in Fig. 3 when solenoid 53 actuates timing mechanism 60 by means of pawl 53a, ratchet wheel 53b, pin 53c fixed to the ratchet wheel, and lever 53d pivoted around point 53f. When pin 53c rests in the position shown in Fig. 3, the next stroke of the solenoid will cause lever 53d to rise, depress 60 and start the timing mechanism. Arrester pawl 53e prevents undesired clockwise motion when the solenoid withdraws for a new stroke. Springs 53g serve to retain the pawls 53a and 53e in engaged position. In the arrangement shown the timing mechanism is actuated every sixth stroke of the solenoid. Thus by selecting a desired number of ratchet teeth and actuating pins 53e, which may be spaced on the ratchet wheel either evenly or unevenly, any desired sequence of oscillations between starting, stopping, and starting again may be obtained. By taking the average of several oscillations, considerable precision can be achieved despite disturbing influences of swell, wind or the like.

The resetting of the stop-clock to its zero position may be accomplished by the contact between 26 and 28 at the next following oscillation of the ship; the same result may be realized manually by means of a push button or throwing out the main switch.

A feature of the apparatus described is that one standard instrument is applicable to any ship, the only change required being the adaptation to the various radii of gyration by the calibration of the dial 64, or by adjusting the distance between 62 and 63, or by adjusting the speed of the stop-clock mechanism.

It is essential that the free rolling oscillations created according to our method be substantially greater than any pre-existing movement of the ship caused by swell, wind, or other disturbances. Therefore, by comparatively or substantially calm water we mean that degree of disturbance which creates forced rolling oscillations considerably smaller than the rolling oscillations excited according to our method.

We desire it understood that the invention is not to be confined to the particular form shown and described, the same being merely illustrative, and that the invention can be carried out in other ways without departing from the spirit of our invention, and therefore, we claim broadly the right to employ all equivalent instrumentalities coming within the scope of the appended claims, and by means of which objects of our in-

We claim:

1. In the method of determining the metacentric height of a floating vessel, the steps of exciting rolling oscillations of said vessel by exerting rolling impulses through the rhythmical movement of a weight, stopping the movement of said weight after a sufficient angle of roll has been attained, and measuring the period of the ensuing free roll as an index of metacentric height.

2. The method of finding the metacentric height of a floating vessel, which comprises exciting rolling oscillations of said vessel in substantially calm water by exerting rolling impulses thereon through the rhythmical movement of a weight, applying devices responsive to the transverse inclination of said vessel for signaling when to move said weight, stopping said movement after a sufficient angle of roll has been attained, and measuring the period of the ensuing free roll as an index of metacentric height.

3. The method of determining the metacentric height of a floating vessel which comprises exciting rolling oscillations of said vessel in substantially calm water by exerting rolling impulses thereon by the application of heeling forces of rhythmically changing intensity at a fixed point of the ship and after a sufficient angle of roll has been attained, measuring the period of ensuing free roll as an index of metacentric height.

4. The method of finding the metacentric height of a floating vessel rolling irregularly in disturbed water which comprises exciting regular rolling oscillations of said vessel superimposed on said irregular rolling by exerting rhythmical rolling impulses thereto in synchronism with the vessel's natural period of roll until said regular rolling reaches amplitudes substantially greater than said irregular rolling and measuring the average period between extreme inclinations of the combined movement as an index of metacentric height.

5. The method of finding the metacentric height of a floating vessel, which comprises exciting rolling oscillations of said vessel in substantially calm water by exerting rolling impulses thereon by the application of heeling forces of rhythmically changing intensity, applying devices responsive to the transverse inclination of said vessel for signaling when to apply said forces, and after a sufficient angle of roll has been attained measuring the period of the ensuing free roll as an index of metacentric height.

JOHANN KREITNER.
ROBERT M. KRISTAL.

REFERENCES CITED

The following references are of record in the file of this patent:

UNITED STATES PATENTS

| Number | Name | Date |
|---|---|---|
| 1,730,941 | Myers | Oct. 8, 1929 |
| 1,860,345 | Wilson | May 24, 1932 |

FOREIGN PATENTS

| Number | Country | Date |
|---|---|---|
| 245,162 | Great Britain | Mar. 18, 1926 |
| 234,543 | Great Britain | May 26, 1925 |

Certificate of Correction

Patent No. 2,431,405. November 25, 1947.

JOHANN KREITNER ET AL.

It is hereby certified that error appears in the above numbered patent requiring correction as follows: In the heading to the printed specification, lines 6 and 7, for the filing date "February 19, 1944" read *February 11, 1944*; and that the said Letters Patent should be read with this correction therein that the same may conform to the record of the case in the Patent Office.

Signed and sealed this 10th day of February, A. D. 1948.

[SEAL]

THOMAS F. MURPHY,
*Assistant Commissioner of Patents.*